(12) United States Patent
Yuan et al.

(10) Patent No.: US 8,264,827 B2
(45) Date of Patent: Sep. 11, 2012

(54) LIQUID CRYSTAL DISPLAY HAVING FASTENING DEVICE

(75) Inventors: Jie Yuan, Kunshan (CN); Gong-Yi Dai, Kunshan (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 276 days.

(21) Appl. No.: 12/468,227

(22) Filed: May 19, 2009

(65) Prior Publication Data
US 2010/0045889 A1 Feb. 25, 2010

(30) Foreign Application Priority Data
Aug. 19, 2008 (TW) ................. 97131626 A

(51) Int. Cl.
*H05K 5/00* (2006.01)
(52) U.S. Cl. ......... 361/679.21; 361/679.58; 248/229.12; 248/924
(58) Field of Classification Search .............. 403/68, 403/80, 104, 105, 106, 107, 108, 187, 188, 403/231, 3, 4; 248/229.12, 229.22, 346.07, 248/917, 924; 349/58; 361/679.58, 679.21, 361/679.01; 269/95
See application file for complete search history.

(56) References Cited

U.S. PATENT DOCUMENTS

| | | | | | |
|---|---|---|---|---|---|
| 1,281,531 | A | * | 10/1918 | Dietrich | 248/228.5 |
| 1,343,930 | A | * | 6/1920 | Neely | 248/72 |
| 4,181,293 | A | * | 1/1980 | Laribee | 403/108 |
| 5,457,745 | A | * | 10/1995 | Wang | 379/454 |
| 6,073,901 | A | * | 6/2000 | Richter | 248/316.4 |
| 7,401,755 | B2 | * | 7/2008 | Wu | 248/346.07 |
| 7,407,141 | B2 | * | 8/2008 | Boulard | 403/87 |

FOREIGN PATENT DOCUMENTS

| | | | |
|---|---|---|---|
| JP | 2000-276072 | * | 6/2000 |
| TW | 200815869 A | | 4/2008 |
| TW | 200818243 A | | 4/2008 |
| WO | WO 2007/105272 | * | 9/2007 |

\* cited by examiner

*Primary Examiner* — Michael P Ferguson
(74) *Attorney, Agent, or Firm* — Cheng-Ju Chiang

(57) ABSTRACT

A fastening device is provided for fastening at least one article on a carrier. The fastening device includes at least one positioning component, a fixed plate fixed on the carrier, and a pressing plate positioned on the fixed plate by the positioning component. The pressing plate has at least one positioned portion and a retaining plate corresponding to the fixed plate. The retaining plate abuts against a side edge of the article for preventing the article from moving along a first direction. The positioning component movably passes through the positioned portion to allow the pressing plate to selectively move along the first direction and be positioned on the fixed plate for adjusting the distance between the retaining plate and the fixed plate.

7 Claims, 7 Drawing Sheets

LIQUID CRYSTAL DISPLAY HAVING FASTENING DEVICE

CLAIM OF PRIORITY

This application claims priority to Taiwanese Patent No. 097131626 filed on Aug. 19, 2008.

BACKGROUND OF THE INVENTION

1. Field of the Invention

The invention relates to a fastening device, and more particularly to a fastening device for fastening at least one article in a carrier. The invention also relates to a liquid crystal display having a fastening device.

2. Description of Related Art

Recently, with the development of technologies, liquid crystal displays (LCD) have been applied to various fields. Nowadays, the trend of LCD technologies is to provide a touch plate on a LCD for providing an inputting means. Since the application of the touch plate is gradually widespread day by day, the touch plate has become an essential inputting means of various electronic apparatuses, such as computers, PDAs (personal digital assistants), and mobile phones. The application of the touch plate may provide advantages of high reaction speed, less occupied space and simplified assembly. For users, they may touch a display screen of the electronic apparatuses to finish inputting data or instructions through the touch plate by their fingertips, so that the users pay much attention to the touch plate. In other words, the touch plate may increase the competence of the electronic apparatuses in a market.

In a conventional assembly, a light transmitting touch plate is mounted on a display screen of a LCD for users to touch and input instructions. Presently, three different ways of assembling are known:

(1) Fastened by adhering: A touch plate is firstly positioned on a specific fixture and located at a target position of a LCD. Then, the touch plate is attached to the target position by adhesive or tape. The method is useful for various touch plates of different sizes and provides a high fastening strength. However, there are still some disadvantages in the method. For example, it is difficult to detach the touch plate from the LCD after being attached. The method only may be carried out by using the specific fixture to position the touch plate. Furthermore, if the attachment of the touch plate is incorrect, the touch plate may not be adjusted again. In other words, an electronic device having the incorrect attached touch plate may not normally work.

(2) Fastened by a plastic structure: An outer frame of an electronic device has an inner surface provided with a fastening structure which is made of plastic material and specifically designed for fastening a touch plate. The method is advantageous to carry out mass production and assembly operation, while the touch plate may be easily disassembled. However, the method is unsuitably applied to an electronic device having an open type display. Meanwhile, it is necessary to design different fastening structures for various touch plates having different sizes. In other words, the fastening structure only may provide a lower universality, and disadvantageous to decrease the manufacture cost of the electronic device.

(3) Fastened by a metal pressing member: A touch plate is fastened on an electronic device by using a metal pressing member having a bent portion of 90 degrees. The pressing member includes a fixed plate, a pressing plate and a retaining plate, wherein the pressing plate is vertically extended from the fixed plate, the retaining plate is vertically formed on the pressing plate by punching, and the retaining plate is parallel to the fixed plate. In assembly, the fixed plate is fixed on a side wall of the electronic device, the pressing plate abuts against a surface of the touch plate, and the retaining plate abuts against an edge of the touch plate. Thus, the touch plate may be fastened on the electronic device based on three dimensional directions. The method is advantageous to carry out assembly operation and disassembly operation, and provide a high fastening strength. However, the metal pressing member is an integrated one-piece metal sheet, wherein the distance between the retaining plate and the fixed plate is fixed and may not be adjusted. As a result, the metal pressing member only may be applied to the electronic device which has a fixed distance between the edge of the touch plate and the side wall of the electronic device. If the distance between the edge of the touch plate and the side wall of the electronic device is varied, it is necessary to manufacture another specific pressing member with different size. Therefore, the method only may provide a lower universality, and may not be applied to touch plates with various specifications.

SUMMARY OF THE INVENTION

The invention is to provide a fastening device, and the fastening device enhances the fastening strength, lowers the manufacture cost, increases the assembly/disassembly convenience, and improves the universality for being applied to various products with different specifications.

The invention is to provide a liquid crystal display (LCD) having a fastening device, wherein a LCD module and a touch plate stacked on the LCD module may be stably, efficiently and adjustably fastened in a carrier housing by using the fastening device.

To achieve one, parts or all of the above objects, a fastening device of one embodiment of the invention is provided for fastening at least one article on a carrier. The fastening device includes at least one positioning component, a fixed plate fixed on the carrier, and a pressing plate positioned on the fixed plate by the positioning component. The pressing plate has at least one positioned portion and a retaining plate corresponding to the fixed plate. The retaining plate abuts against a side edge of the article for preventing the article from moving along a first direction. The positioning component movably passes through the positioned portion to allow the pressing plate to selectively move along the first direction and be positioned on the fixed plate for adjusting a distance between the retaining plate and the fixed plate.

In another embodiment of the invention, a liquid crystal display (LCD) is provided and includes: a housing having a side wall for defining a receiving space; a LCD module disposed in the receiving space of the housing; a touch panel (i.e. touch plate) disposed on a surface of the LCD module and having a horizontal side surface and a vertical side edge, wherein both of the horizontal side surface and the vertical side edge are adjacent to an inner surface of the side wall of the housing; and at least one fastening device clipping the horizontal side surface and the vertical side edge of the touch panel to the side wall of the housing for fastening the touch panel on the housing. The fastening device includes at least one positioning component, a fixed plate fixed on an outer surface of the side wall of the housing, and a pressing plate positioned on the fixed plate by the positioning component. The pressing plate has at least one positioned portion and a retaining plate corresponding to the fixed plate. The retaining plate abuts against the vertical side edge of the touch panel for preventing the touch panel from moving along a first direction parallel to the horizontal side surface. The positioning component movably passes through the positioned portion to allow the pressing plate to selectively move along the first direction and be positioned on the fixed plate for adjusting the distance between the retaining plate and the fixed plate. At least one portion of the pressing plate abuts against the horizontal side surface of the touch panel for preventing the touch panel from moving along a second direction perpendicular to the horizontal side surface.

The fastening device of the embodiment of the invention may provide an adjustable assembling relationship between the fixed plate, the pressing plate and the retaining plate, so as to stably and efficiently fasten the article based on three dimensional directions. Meanwhile, the distance between the fixed plate and the retaining plate may be optionally adjusted to match various articles with different sizes for fastening the articles, so as to enhance the fastening strength, lower the manufacture cost, increase the assembly/disassembly convenience, and improve the universality.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The structure and the technical means adopted by the present invention to achieve the above and other objects may be better understood by referring to the following detailed description of the preferred embodiments and the accompanying drawings, wherein.

DETAILED DESCRIPTION OF THE EMBODIMENTS

Figure 1:
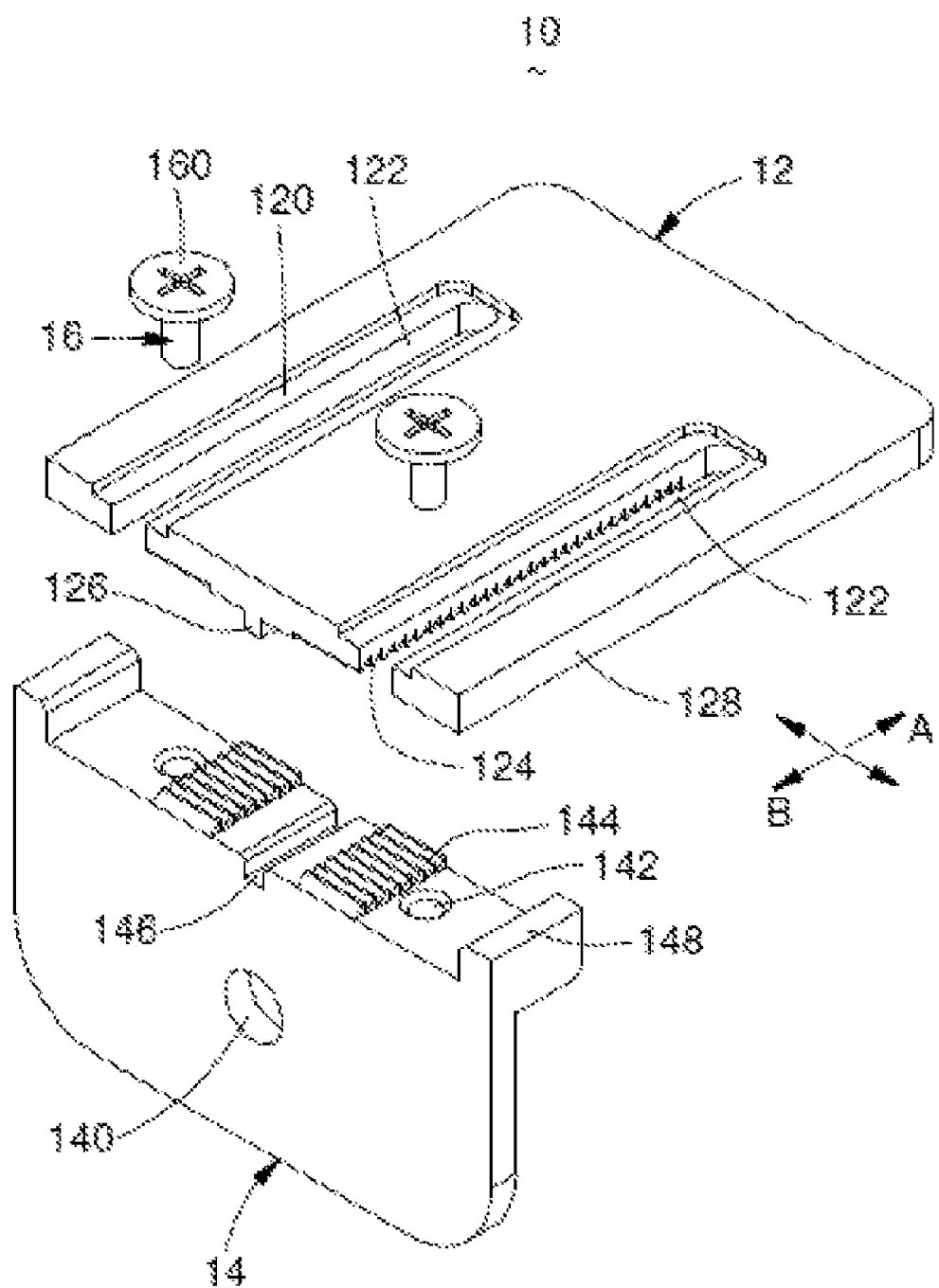
FIG. 1 is an exploded perspective view of a fastening device according to an embodiment of the invention.
Figure 2:
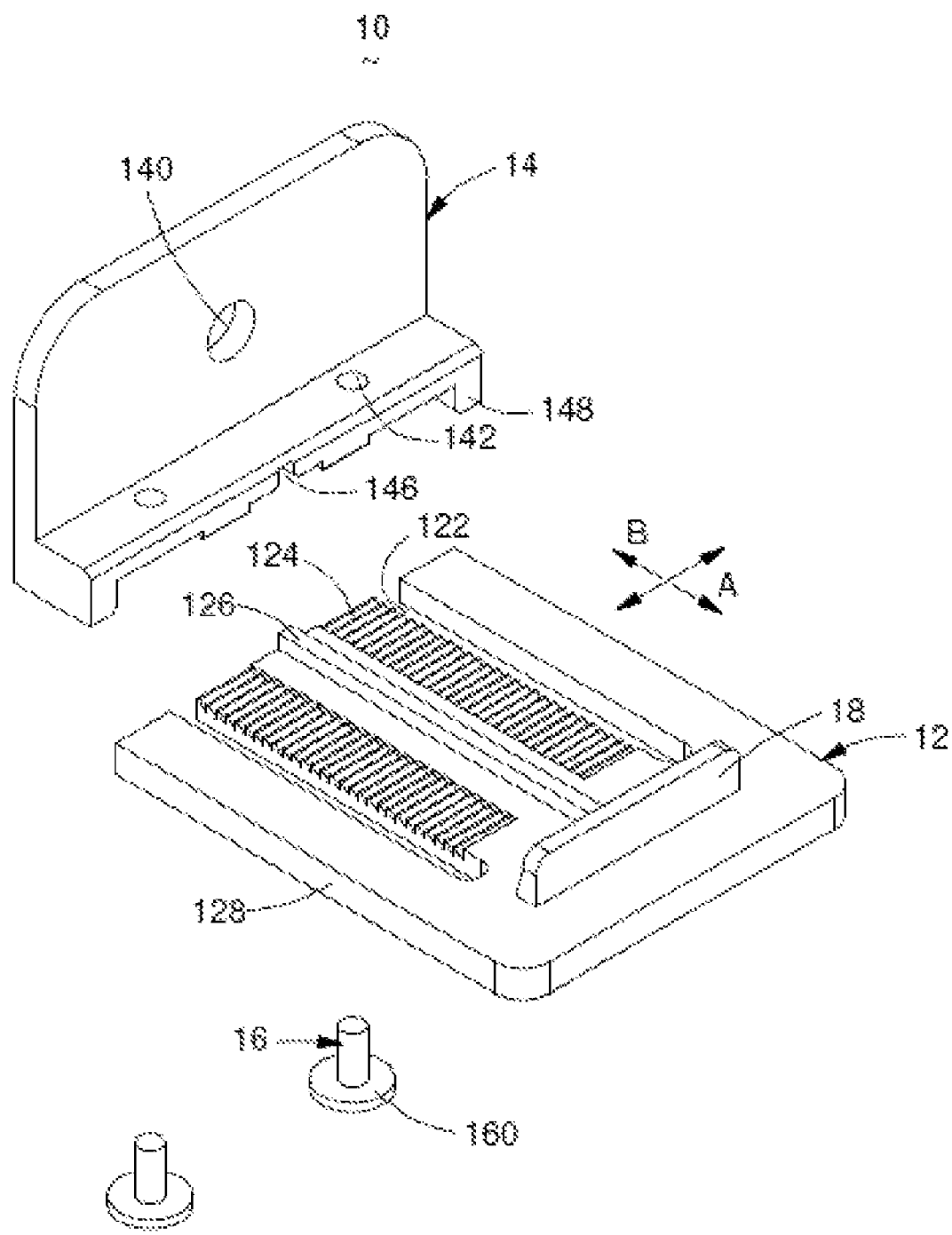
FIG. 2 is an exploded perspective bottom view of the fastening device according to an embodiment of the invention.
Figure 3:
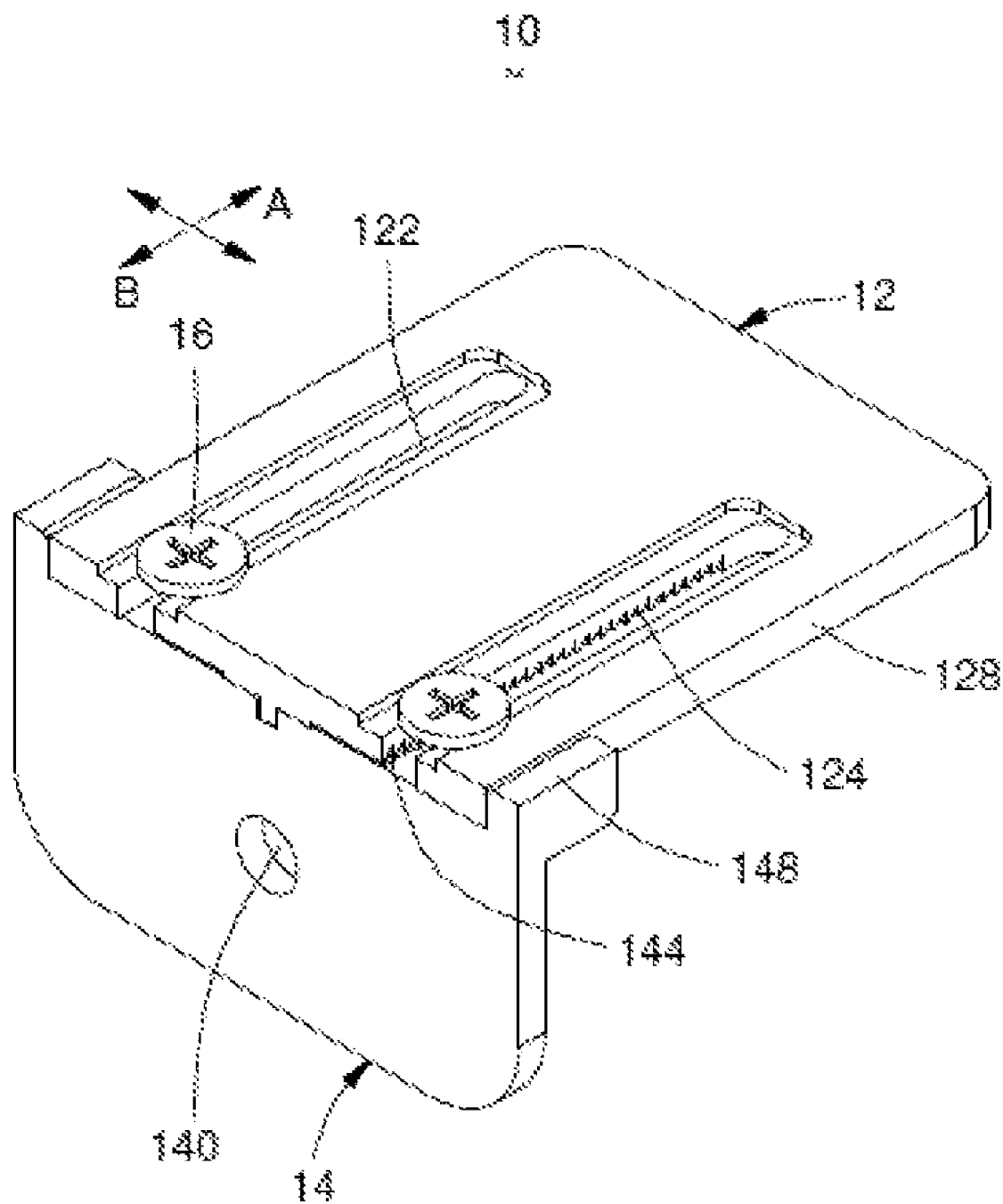
FIG. 3 is an assembled perspective view of the fastening device according to an embodiment of the invention.
Figure 4:
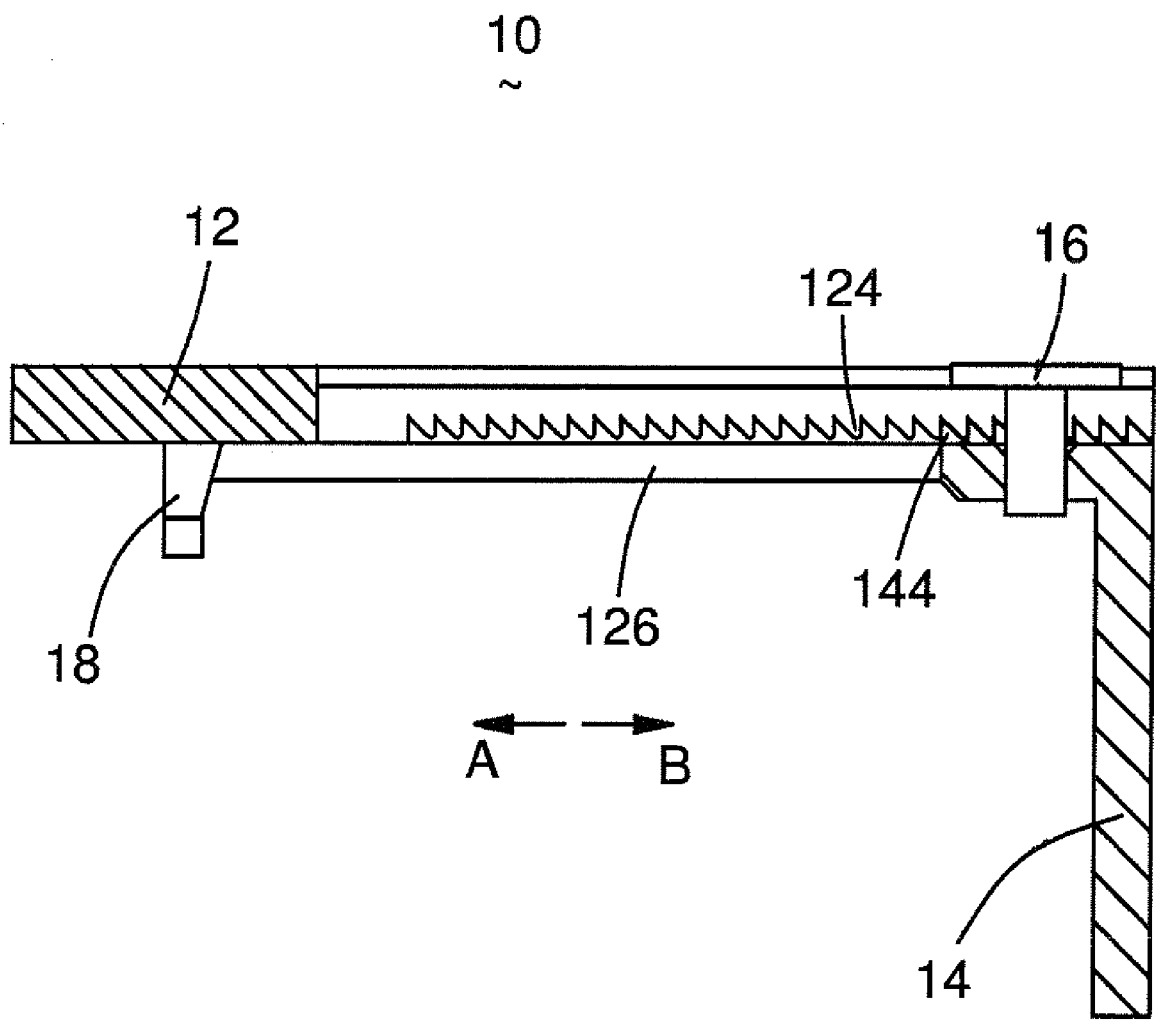
FIG. 4 is a cross-sectional view of the fastening device according to an embodiment of the invention.

In the following detailed description of the preferred embodiments, reference is made to the accompanying drawings which form a part hereof, and in which shown by way of illustration specific embodiments in which the invention may be practiced. In this regard, directional terminology, such as "top," "bottom," "front," "back," etc., is used with reference to the orientation of the Figure(s) being described. The components of the present invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Referring to FIGS. 1-4, a fastening device 10 adapted to fastening one or more than one article (not shown) on a carrier (not shown) is provided. For example, in the embodiment of the invention, the fastening device 10 is applied to an electronic apparatus having a display device for fastening the display device on/in a carrier installed in the electronic apparatus, wherein the display device may be a liquid crystal display (LCD), and the LCD is fastened in the carrier installed in the electronic apparatus by the fastening device 10. Furthermore, the LCD may be assembled with a touch plate. In this case, the fastening device 10 in the embodiment of the invention fastens the touch plate and the LCD on/in the carrier.

In the embodiment of the invention, the fastening device 10 includes a pressing plate 12, a fixed plate 14, and at least one positioning component 16, and the pressing plate 12, the fixed plate 14, and the positioning component 16 may be made of any suitable material. In the embodiment of the invention, the pressing plate 12, the fixed plate 14, and the positioning component 16 are made of plastic material, and the positioning component 16 also may be made of metal.

Figure 6:
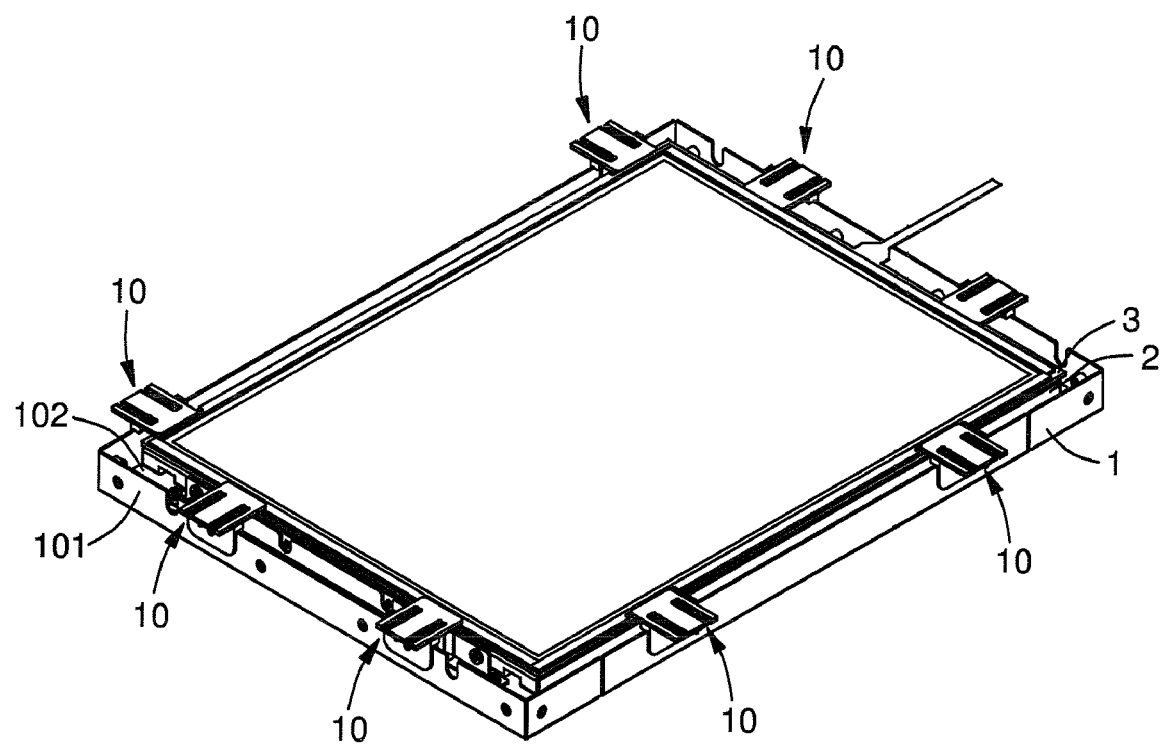
FIG. 6 is a perspective view of the fastening device applied to a liquid crystal display according to an embodiment of the invention.
Figure 7:
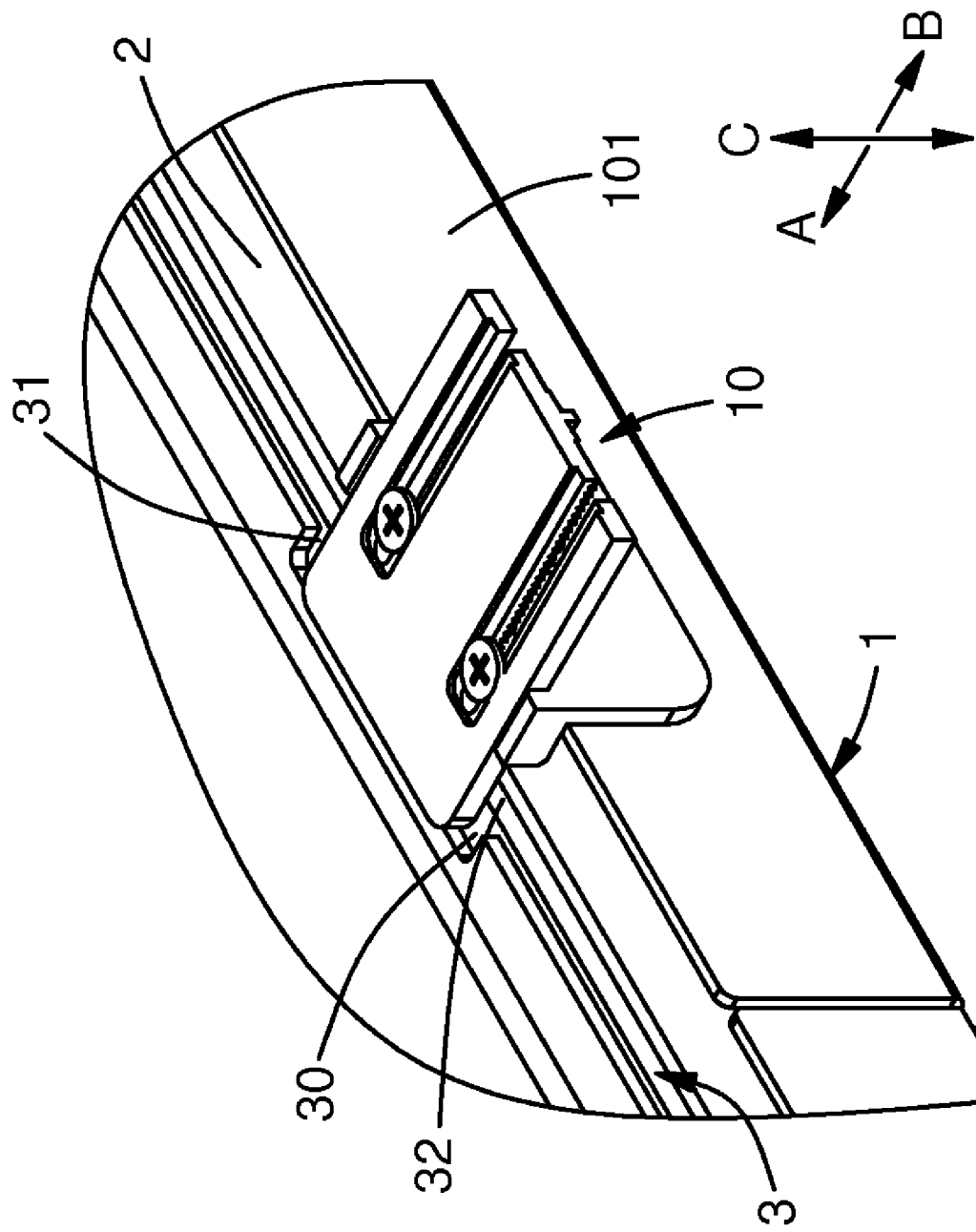
FIG. 7 is a partially enlarged view of FIG. 6.

In the embodiment of the invention, the fixed plate 14 is fixed on the carrier For example, the carrier may be a housing of the LCD or a fixed portion of the LCD. The fixed plate 14 may be fixed on the carrier by any suitable means, such as screws, rivets, adhesive, or one-piece integration with the carrier. In the embodiment, the fixed plate 14 is fixed on the carrier by screws, while the fixed plate 14 is attached to a surface of the carrier, such as a side wall 101 of the housing of the LCD, as shown in FIGS. 6 and 7. Meanwhile, the fixed plate 14 is formed with at least one fixed hole 140, and a screw (not shown) may pass through the fixed hole 140 to screw-connect to a corresponding fixed hole (not shown) formed on the carrier, so that the fixed plate 14 may be fixed on the carrier. The fixed hole formed on the carrier may be provided with an inner thread for screw-connecting to the screw. Alternatively, the screw may be screw-connected to a nut (not shown) for fixing the fixed plate 14 on the carrier.

In the embodiment of the invention, the pressing plate 12 is positioned on the fixed plate 14 by the positioning component 16. The pressing plate 12 has at least one positioned portion 122 and a retaining plate 18 corresponding to the fixed plate 14. The retaining plate 18 is used to abut against a side edge of the article for preventing the article from moving along a first direction. The positioning component 16 may movably pass through the positioned portion 122 to allow the pressing plate 12 to selectively move along the first direction and be positioned on the fixed plate 14 for adjusting the distance between the retaining plate 18 and the fixed plate 14.

In the embodiment of the invention, an adjustable connection between the pressing plate 12 and the fixed plate 14 is provided for matching with various articles having different sizes. The pressing plate 12 may move along the first direction or an opposite direction thereof in relation to the fixed plate 14, so that the pressing plate 12 may selectively move toward the article or move away from the article. For example, the first direction may be an arrow direction A or B as shown in FIGS. 1-4, wherein the arrow direction A means that the pressing plate 12 moves toward the article, and the arrow direction A is also referred to as an "inward direction". The arrow direction B means that the pressing plate 12 moves away from the article, so that the arrow direction B is also referred to as an "outward direction" opposite to the inward direction A. According to the adjustable connection, the relative position of the pressing plate 12 in relation to the fixed plate 14 is adjusted for matching with various articles having different sizes.

In the embodiment of the invention, the adjustable connection between the pressing plate 12 and the fixed plate 14 includes the positioning component 16 and the positioned portion 122 formed on the pressing plate 12, and the positioned portion 122 is matched with the positioning component 16. In the embodiment, In order to enhance orientation effect, the number of the positioning component 16 and the number of the positioned portion 122 each are two, and are not limited thereto. The positioned portion 122 of the pressing plate 12 is a slot longitudinally extended along the first direction and formed on the pressing plate 12, and the positioning component 16 is capable of moving in the positioned portion 122 along the first direction. In other words, the pressing plate 12 is capable of selectively moving in relation to the fixed plate 14 (and the positioning component 16), wherein the positioning component 16 is integrally connected to the fixed plate 14 or an individual component suitably connected to the fixed plate 14. In the embodiment, the positioning component 16 is a positioning pin, and the fixed plate 14 has a surface facing the pressing plate 12 and is formed with at least one positioned hole 142 corresponding to the positioned portion 122. The positioning component 16 has one end passing through the positioned portion 122 and inserted into the positioned hole 142, so that the pressing plate 12 may selectively move in relation to the fixed plate 14. In the embodiment, the longitudinal direction of the positioned portion 122 is the first direction (parallel to the inward direction A or the outward direction B), and the pressing plate 12 may selectively move along the inward direction A or the outward direction B in relation to the fixed plate 14. In other embodiments, the positioned portion 122 may include a plurality of holes (not shown) arranged on the pressing plate 12 along the first direction, wherein the positioning component 16 has one end fixed in the positioned hole 142 and the other end selectively passing through one of the holes of the positioned portion 122 on the pressing plate 12, so that the position of the pressing plate 12 may be selectively adjusted in relation to the fixed plate 14.

In the embodiment of the invention, the positioning component 16 has an enlarged end 160, and two opposite sides of the positioned portion 122 of the pressing plate 12 each have a recess 120 for containing the enlarged end 160 of the positioning component 16, so as to provide an engagement relationship between the recess 120 and the enlarged end 160 for preventing the pressing plate 12 from separating from the fixed plate 14.

In the embodiment of the invention, the positioning component 16 is a screw having one end passing through and screw-connecting to the positioned hole 142 of the fixed plate 14. In this case, the positioned hole 142 is a hole having an inner thread for being screw-connected to the screw. Alternatively, the positioned hole 142 is a through hole, and the screw passes through the positioned hole 142 and screw-connects to a nut (not-shown) for fixing the pressing plate 12 on the fixed plate 14.

In the embodiment of the invention, the adjustable connection between the fixed plate 14 and the pressing plate 12 includes a positioning structure for selectively positioning the pressing plate 12 on a predetermined position in relation to the fixed plate 14. In the embodiment, the positioning structure includes at least one first positioning rack 124 formed on a surface of the pressing plate 12 facing the fixed plate 14, and at least one second positioning rack 144 formed on a surface of the fixed plate 14 facing the pressing plate 12. The first positioning rack 124 selectively engages with the second positioning rack 144 for selectively positioning the pressing plate 12 on a predetermined position in relation to the fixed plate 14. Thus, when the pressing plate 12 moves to the predetermined position or a desired position along the first direction in relation to the fixed plate 14, the pressing plate 12 may be positioned on the predetermined position or the desired position in relation to the fixed plate 14 by the first and second positioning racks 124, 144.

In the embodiment of the invention, the pressing plate 12 is provided with two of the first positioning racks 124 adjacent to each other, wherein each of the first positioning racks 124 has a plurality of continuous positioning teeth, each of the positioning teeth has a substantially triangular cross-section (unlabeled). Meanwhile, the fixed plate 14 is provided with two of the second positioning racks 144 adjacent to each other, wherein each of the second positioning racks 144 has a plurality of continuous positioning teeth, each of the positioning teeth also has a substantially triangular cross-section (unlabeled). The positioning teeth of the first positioning racks 124 engage with the positioning teeth of the second positioning racks 144 for stably positioning the pressing plate 12 on the fixed plate 14. In addition, the pressing plate 12 may be positioned on different relative positions in relation to the fixed plate 14 by adjusting the relative engagement relationship between the positioning teeth of the first and second positioning racks 124, 144.

Furthermore, at least one lateral retaining structure is disposed between the pressing plate 12 and the fixed plate 14 for preventing the pressing plate 12 from moving along other directions different from the first direction in relation to the fixed plate 14. For example, in the embodiment, the pressing plate 12 is prevented from moving along a transverse direction substantially vertical to the first direction A) in relation to the fixed plate 14. In the embodiment of the invention, the lateral retaining structure includes two retaining walls 148 disposed on two end edges of a surface of the fixed plate 14 facing the pressing plate 12 respectively, wherein the two retaining walls 148 may abut against two opposite side surfaces 128 of the pressing plate 12.

Moreover, in the embodiment of the invention, a guiding structure is disposed between the pressing plate 12 and the fixed plate 14 for precisely providing the adjustable connection between the pressing plate 12 and the fixed plate 14, and for stably guiding the pressing plate 12 to move along the first direction in relation to the fixed plate 14. In the embodiment, the guiding structure includes a guiding rib 126 formed on a surface of the pressing plate 12 facing the fixed plate 14, and a guiding groove 146 formed on a surface of the fixed plate 14 facing the pressing plate 12, wherein the guiding rib 126 engages with the guiding groove 146, and the guiding rib 126 and the guiding groove 146 are extended along a direction substantially parallel to the first direction for guiding the pressing plate 12 to move along the first direction in relation to the fixed plate 14. In other embodiments, the position of the guiding rib 126 and the guiding groove 146 may be interchanged, i.e. the surface of the pressing plate 12 facing the fixed plate 14 may be formed with a guiding groove (not shown), while the surface of the fixed plate 14 facing the pressing plate 12 may be formed with a guiding rib (not shown).

In the embodiment of the invention, the adjustable connection is formed between the pressing plate 12 and the fixed plate 14. However, it may be understood that the connection between the pressing plate 12 and the fixed plate 14 also may be un-adjustable, i.e. the pressing plate 12 may be fixed on the fixed plate 14. The pressing plate 12 extends toward the article received in the carrier and presses a surface of the article for preventing the article from moving along a normal direction vertical to the surface of the article. In this case of the fixed connection between the pressing plate 12 and the fixed plate 14, the retaining plate 18 is adjustably connected to the pressing plate 12, so that the retaining plate 18 may move in relation to the pressing plate 12 (and the fixed plate 14) to selectively abut against the side edge of the article. In other embodiments, the size of the retaining plate 18 and the fixed plate 14 may be suitably adjusted, and the position of the retaining plate 18 and the fixed plate 14 may be interchanged, i.e. the retaining plate 18 is fixed on the carrier, and the fixed plate 14 abuts against the side edge of the article for fastening the article on the carrier. Thus, the fastening function of the fastening device 10 of the invention is still carried out.

Figure 5:
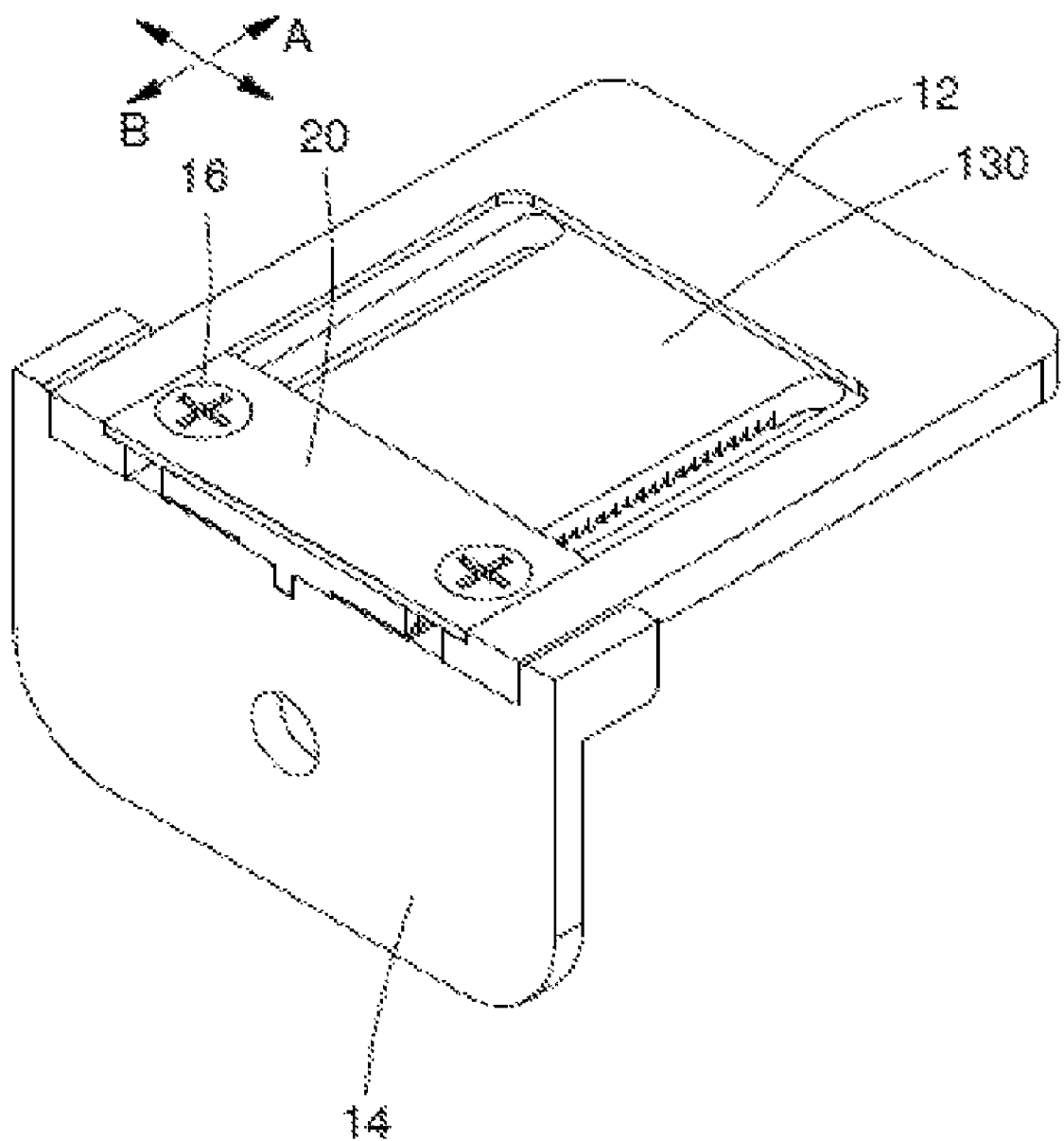
FIG. 5 is an assembled perspective view of a fastening device according to an embodiment of the invention.

Referring now to FIG. 5, the pressing plate 12 has a surface formed with a recessed zone 130, and the recessed zone 130 is provided with two separated positioned portions 122 (also referring to FIG. 1) for receiving two of the positioning components 16 disposed on the fixed plate 14, so that the pressing plate 12 may move in relation to the positioning components 16. Furthermore, a strengthening plate 20 is provided in the recessed zone 130, and formed with two through holes (unlabeled) corresponding to two of the positioned holes 142 on the fixed plate 14 (also referring to FIG. 1). Each of the positioning components 16 is inserted into each of the through holes of the strengthening plate 20, and connected to each of the positioned holes 142 on the fixed plate 14, so as to connect the pressing plate 12 to the fixed plate 14, wherein the strengthening plate 20 is sandwiched between the enlarged end 160 of the positioning component 16 and the recessed zone 130 of the pressing plate 12. Other structures of the embodiment as shown in FIG. 5 is similar to that of the foregoing embodiment as shown in FIGS. 1-4, so that the detailed description thereof is omitted hereinafter.

Referring to FIGS. 6 and 7, the LCD includes a housing 1, a LCD module 2, a touch plate 3 and at least one fastening device 10 adapted to fastening the LCD module 2 and the touch plate 3 on the housing 1. In the embodiment as shown in FIG. 6, the housing 1 is a rectangular frame having four side walls 101, each of the side walls 101 is provided with two of the fastening devices 10 for fastening the LCD module 2 and the touch plate 3 in the housing 1. In this case, the housing 1 is the carrier mentioned in the foregoing description, and the LCD module 2 and the touch plate 3 are the article.

In the embodiment of the invention, the side walls 101 of the housing 1 define a receiving space 102 having a top opening (referenced by the direction as shown in FIG. 6), wherein the LCD module 2 is received into the receiving space 102 from the top opening of the receiving space 102 and an upper surface (unlabeled) of the LCD module 2 is exposed. The touch plate 3 is disposed on the exposed upper surface of the LCD module 2, and has a horizontal side surface 30 having at least one portion exposed from the top opening of the receiving space 102. The horizontal side surface 30 of the touch plate 3 has at least one horizontal edge portion 31 correspondingly adjacent to an inner surface of at least one of the side walls 101 of the housing 1. In the embodiment as shown in FIGS. 6 and 7, the outlines of the LCD module 2 and the touch plate 3 are rectangular and corresponding to the rectangular frame of the housing 1. Meanwhile, the horizontal side surface 30 of the touch plate 3 is rectangular, and has four of the horizontal edge portions 31 correspondingly adjacent to inner surfaces of four of the side walls 101 of the housing 1 respectively.

Each of the four side walls 101 of the housing 1 is provided with two of the fastening devices 10. The two fastening devices 10 on each of the side walls 101 are separated from each other along the side wall 101. As shown in FIG. 6, although each of the side walls 101 is provided with two of the fastening devices 10, it may be understood that each of the side walls 101 also may be provided with different number of the fastening devices 10, such as one, three, or more than three. In addition, the number of the fastening devices 10 on each of the four side walls 101 of the housing 1 may be different from each other. Alternatively, only portions of the side walls 101 is provided with at least one of the fastening device 10, and the other portions of the side walls 101 is not provided with any fastening device 10. For example, two of the side walls 101 adjacent to each other are provided with the fastening devices 10, and the other two of the side walls 101 adjacent to each other are provided with other fastening structures for fastening the touch plate 3 (or keep an open unfixed state). Besides, the fastening devices 10 may be provided on two of the side walls 101 of the housing 1 opposite to each other.

Each of the horizontal edge portions 31 on the horizontal side surface 30 of the touch plate 3 is extended downward to form a vertical side edge 32 corresponding to an inner surface of the related side wall 101 of the housing 1.

The fixed plate 14 of the fastening device 10 is fixed on the side wall 101 of the housing 1, so that the fastening device 10 is connected to the housing 1, wherein the fixing means of the fixed plate 14 are described above and may be carried out by a plurality of different methods. In the foregoing embodiments of the invention, a screw (not-shown) passes through the fixed hole 140 of the fixed plate 14 and is fixed on a corresponding structure (such as a thread hole) on an outer surface of the side wall 101, so as to fix the fastening device 10 on the side wall 101. The pressing plate 12 of the fastening device 10 is extended from the fixed plate 14 on the side wall 101 of the housing 1 to the receiving space 102 of the housing 1, and at least one portion of the pressing plate 12 abuts against the corresponding horizontal edge portion 31 on the side surface 30 of the touch plate 3. Thus, the touch plate 3 may be prevented from moving along a normal direction (i.e. the second direction C) perpendicular to the horizontal side surface 30. Furthermore, the pressing plate 12 may suitably move toward the vertical side edge 32 of the touch plate 3 along the inward direction A in relation to the fixed plate 14, so that the retaining plate 18 of the pressing plate 12 may abut against the vertical side edge 32 of the touch plate 3 for preventing the touch plate 3 from moving along a direction parallel to the side surface 30 (i.e. the first direction A).

When the pressing plate 12 is excessively extended into the receiving space 102 of the housing 1, the retaining plate 18 causes that the pressing plate 12 may not abut against the horizontal side surface 30 of the touch plate 3, and the retaining plate 18 may not correctly abut against the vertical side edge 32 of the touch plate 3. In this case, the pressing plate 12 may be moved outward along the outward direction B in relation to the fixed plate 14, until the retaining plate 18 on the pressing plate 12 may match with the vertical side edge 32 of the touch plate 3. When the pressing plate 12 adjustably moves along the inward direction A or the outward direction B, the retaining plate 18 may efficiently abut against the vertical side edge 32 of the touch plate 3. At this time, the first positioning rack 124 of the pressing plate 12 and the second positioning rack 144 of the fixed plate 14 engage with each other, so that the pressing plate 12 may be positioned on the fixed plate 14. Meanwhile, the pressing plate 12 and the retaining plate 18 may not accidentally separated from the horizontal side surface 30 and the vertical side edge 32 of the touch plate 3, so that the function of the retaining plate 18 and the pressing plate 12 may be maintained. As shown in FIG. 7, after all of the fastening devices 10 are assembled, a redundant portion of the pressing plate 12 extended out of the fixed plate 14 may be cut out or kept according to actual needs.

As described above, the embodiments of the invention may provide one, parts or all of the following advantages:

(1) Higher universality and lower manufacture cost: It is only necessary to prepare two mold assemblies for molding the pressing plate 12 and the fixed plate 14 of the fastening device 10. The fastening device 10 with the same specification may be applied to fasten various articles with different sizes or widths in a carrier.

(2) Higher assembly/disassembly convenience: The pressing plate 12 and the fixed plate 14 of the fastening device 10 may be connected to each other by screws (i.e. the positioning components 16) for conveniently assembling or disassembling the fastening device 10.

(3) Higher reliability: The fastening device 10 may be made by injection molding of plastic material with better stability and suitable strength.

(4) Fixture is unnecessary: The pressing plate 12 and the fixed plate 14 of the fastening device 10 are connected to each other by screws (i.e. the positioning components 16). Thus, when assembling a LCD and a touch plate, the fastening device 10 may precisely fasten the touch plate without using specific fixtures.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A liquid crystal display, comprising:
a housing having a side wall for defining a receiving space;
a liquid crystal display module disposed in the receiving space of the housing;
a touch panel disposed on a surface of the liquid crystal display module and having a horizontal side surface and a vertical side edge, wherein both of the horizontal side surface and the vertical side edge are adjacent to an inner surface of the side wall of the housing; and
at least one fastening device clipping the horizontal side surface and the vertical side edge of the touch panel to the side wall of the housing for fastening the touch panel on the housing, and the fastening device comprising:
two positioning components, each of which is a screw having an enlarged end and an end for screw-connecting;
a fixed plate fixed on an outer surface of the side wall of the housing and extended along a second direction perpendicular to the horizontal side surface of the touch panel; and
a pressing plate extended along a first direction parallel to the horizontal side surface of the touch panel and positioned on the fixed plate by the positioning components, the pressing plate having two positioned portions and a retaining plate facing the fixed plate, wherein each of the positioned portions comprises a slot formed on the pressing plate and extended along the first direction, each of two opposite sides of each of the positioned portions has a recess for containing the enlarged end of one of the positioning components, and the retaining plate vertically extended downward from the pressing plate along the second direction abuts against the vertical side edge of the touch panel for preventing the touch panel from moving along the first direction, and wherein a surface of the fixed plate facing the pressing plate has two positioned holes, each of which is corresponding to one of the positioned portions and has an inner thread for being screw-connected to the end for screw-connecting of the corresponding positioning component, wherein the positioning components movably pass through the positioned portions along the second direction perpendicular to the horizontal side surface to allow the pressing plate to selectively move along the first direction for adjusting a distance between the retaining plate and the fixed plate before the ends for screw-connecting of the positioning components are inserted into and screwed to the positioned holes, and the ends for screw-connecting of the positioning components are for being inserted into and screwed to the positioned holes for positioning the pressing plate on a predetermined position of the fixed plate; and wherein a lower surface of at least one portion of the pressing plate abuts against the horizontal side surface of the touch panel for preventing the touch panel from moving along the second direction perpendicular to the horizontal side surface.

2. The liquid crystal display as claimed in claim 1, further comprising a positioning structure for selectively positioning the pressing plate on a predetermined position in relation to the fixed plate.

3. The liquid crystal display as claimed in claim 2, wherein the positioning structure comprises at least one first positioning rack formed on the lower surface of the pressing plate facing the fixed plate, and at least one second positioning rack formed on the surface of the fixed plate facing the pressing plate, and the first positioning rack selectively engages with the second positioning rack for positioning the pressing plate on the predetermined position in relation to the fixed plate.

4. The liquid crystal display as claimed in claim 1, further comprising at least one lateral retaining structure disposed between the pressing plate and the fixed plate for preventing the pressing plate from moving along a transverse direction substantially perpendicular to the first direction.

5. The liquid crystal display as claimed in claim 4, wherein the lateral retaining structure comprises two retaining walls disposed on two end edges of a surface of the fixed plate facing the pressing plate respectively, and the two retaining walls abut against two opposite side surfaces of the pressing plate.

6. The liquid crystal display as claimed in claim 1, further comprising a guiding structure disposed between the pressing plate and the fixed plate for guiding the pressing plate to move along the first direction in relation to the fixed plate.

7. The liquid crystal display as claimed in claim 6, wherein the guiding structure comprises a guiding groove formed on the surface of the fixed plate facing the pressing plate, and a guiding rib formed on the lower surface of the pressing plate facing the fixed plate, and the guiding rib engages with the guiding groove for guiding the pressing plate to move in relation to the fixed plate.

* * * * *